United States Patent [19]

Torrington

[11] 4,133,540

[45] Jan. 9, 1979

[54] RECORD HANDLING SYSTEM FOR A VIDEO DISC PLAYER

[75] Inventor: Leslie A. Torrington, Indianapolis, Ind.

[73] Assignee: RCA Corporation, New York, N.Y.

[21] Appl. No.: 801,604

[22] Filed: May 31, 1977

[30] Foreign Application Priority Data

Dec. 20, 1976 [GB] United Kingdom ............... 53173/76

[51] Int. Cl.² ............................................. G11B 25/04
[52] U.S. Cl. ..................................... 274/9 B; 358/128
[58] Field of Search ................. 274/1 R, 9 B; 360/97, 360/99, 133, 86; 358/128; 179/100.3 V, 100.1 B, 100.4 R

[56] References Cited

U.S. PATENT DOCUMENTS

| | | | |
|---|---|---|---|
| 3,377,072 | 4/1968 | Gentilini | 274/9 B X |
| 3,823,948 | 7/1974 | Jenkins | 274/9 B |
| 3,940,793 | 2/1976 | Bleiman | 274/9 B X |

Primary Examiner—Charles E. Phillips
Attorney, Agent, or Firm—Eugene M. Whitacre; Joseph S. Tripoli; Dilip A. Kulkarni

[57] ABSTRACT

A protective cover for a video disc record comprises a jacket and a record retaining tray removably located therein. A video disc player includes latch arms which engage the record retaining tray when an occupied cover is fully inserted into the player. Such engagement causes an extraction of the record retaining tray from the jacket during jacket withdrawal subsequent to the occupied cover arrival at the fully inserted position, whereby an enclosed record is retained in the player resting on a depressible platform upon a completion of such a jacket withdrawal. A subsequent lowering of the platform effects a transfer of the retained record to the player turntable for rotation therewith with independence from the record retaining tray.

12 Claims, 29 Drawing Figures

RECORD HANDLING SYSTEM FOR A VIDEO DISC PLAYER

This invention generally relates to a video disc player. More particularly, this invention relates to a handling system which permits insertion of a video disc into the player, and its extraction therefrom, without direct handling thereof by the user.

In U.S. Pat. No. 3,842,194, issued to Jon K. Clemens, a video disc system is disclosed. In an arrangement therein disclosed, an information track consists of geometric variations in the bottom of a smooth spiral groove on the surface of a disc record. The disc record has a deposit of dielectric material overlying a coating of conductive material. During playback, variations in the capacitance formed between an electrode incorporated in a groove-riding stylus and the conductive coating of the disc record are sensed as it is rotated by a supporting turntable to reconstruct the recorded information.

In the systems of the Clemens type, in order to obtain adequate playing time, the successive groove convolutions are relatively closely spaced on the surface of the video disc (e.g., 4.5 micrometers corresponding to a groove density of 5,555 gpi) and the signal elements in the groove bottom are relatively small (e.g., signal element length — 0.3 to 0.8 micrometers and signal element depth of 0.10 to 0.15 micrometers).

The accumulation of dust on such video discs presents a problem. The problem of dust accumulation is aggravated when the exposure of a video disc to atmospheric dust is accompanied by the condition of high temperature and high humidity. It is therefore advantageous to provide a cover which completely encloses the video disc in a dustproof environment during its storage and handling.

The video discs of the type described above are prone to damage during their manual handling (e.g., scratches, fingerprints, etc.). It is therefore desirable to provide a system which permits insertion and withdrawal of a video disc into and from a player without its direct handling by the user.

Systems for inserting and withdrawing a video disc into and from a player without its direct handling by the consumer are described in (1) U.S. patent application, Ser. No. 747,865, entitled "VIDEO DISC HANDLING SYSTEM FOR A VIDEO DISC PLAYER," filed for M. A. Leedom, and (2) U.S. patent application, Ser. No. 747,729, entitled "VIDEO DISC INSERTION/EXTRACTION SYSTEM FOR A VIDEO DISC PLAYER," filed for C. F. Coleman. Both Leedom and Coleman applications are assigned of record to the assignee of the instant application.

In the systems illustrated in the Leedom and Coleman applications, a record extracting mechanism engages the record periphery to prevent its removal from the player during cover withdrawal subsequent to an occupied cover arrival at a fully inserted position in the player.

In accordance with an advantageous arrangement herein disclosed, engagement of the record extracting member with the record is not needed to effect the extraction of the record from its cover. The player, pursuant to this invention, is suitable for use with a disc record removably subject to occupancy of a protective cover comprising a jacket and a record retaining member removably located therein. The player housing has an input slot dimensioned to permit an insertion of a record cover into the player and its removal therefrom. The player includes guides aligned with the input slot for facilitating the cover insertion and removal. A platform mounted in the housing, and disposed under the guides, is movable between an elevated position and a depressed position. Means are mounted in the player for engaging the record retaining member during cover arrival at a fully inserted position in the player. The engaging means are subject to operation in a first condition and a second condition. The player includes means, responsive to cover arrival at the fully inserted position in the player, for alternating the condition of the engaging means between the first condition and the second condition. The engaging means, while disposed in the first condition, permits cover arrival at the fully inserted position. The engaging means, while disposed in the second condition, precludes a removal from the player of a record retaining member during a jacket withdrawal from the fully inserted position, whereby jacket withdrawal subsequent to an occupied cover arrival at the fully inserted position results in retention of the enclosed record in the player. The record retaining member is so constructed that the retained record is permitted to rest on the platform upon a completion of the jacket withdrawal. The player includes means for depressing the platform to effect a transfer of the retained record from the platform to the player turntable.

Figure 7:
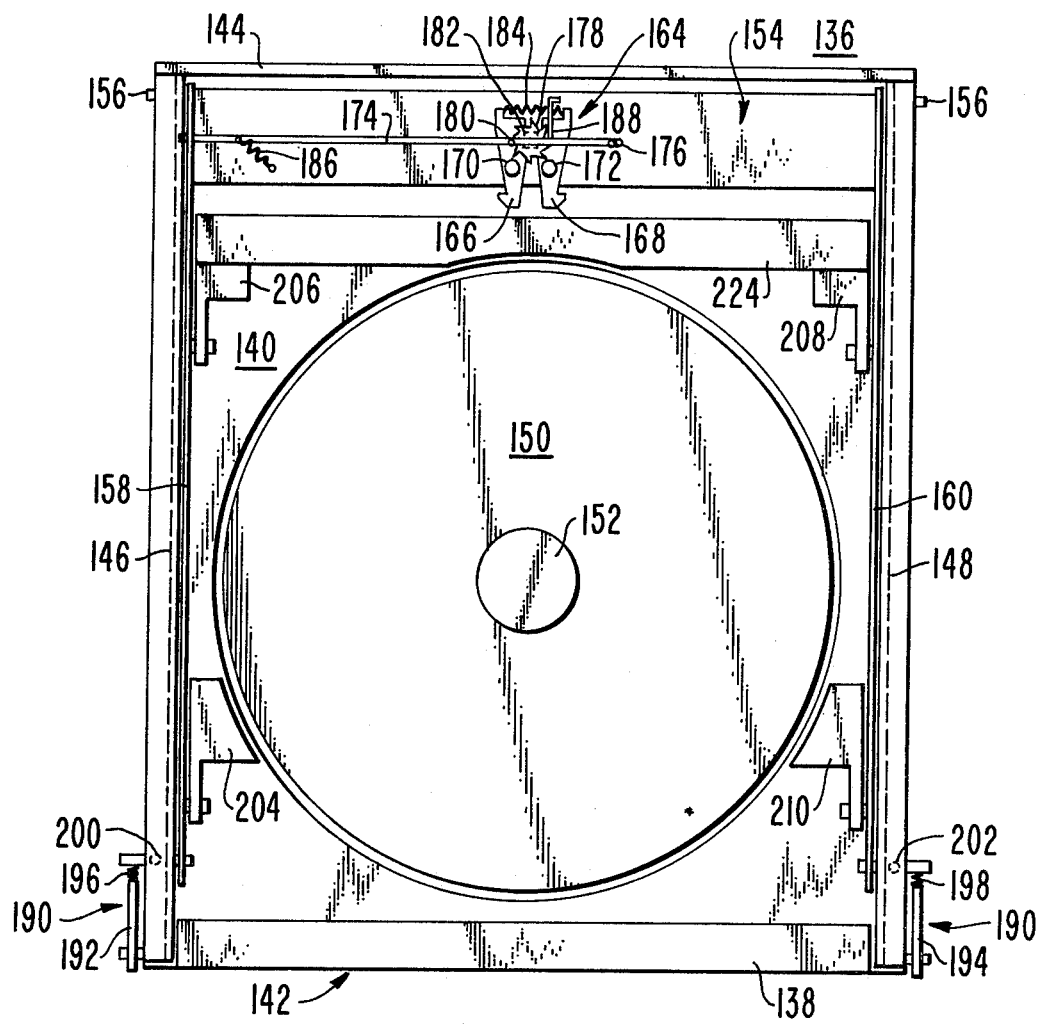
FIG. 7 represents the plan view of a video disc system incorporating the principles of the present invention.
Figure 12:
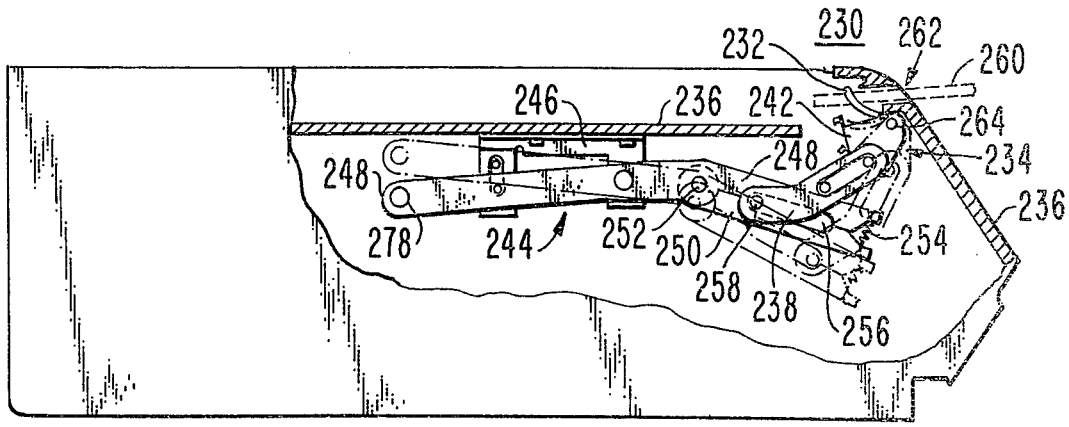
FIG. 12 shows a side view of a video disc system incorporating the principles of the present invention; the video disc system of FIG. 12 includes a modified platform lifting/lowering mechanism.
Figure 13:
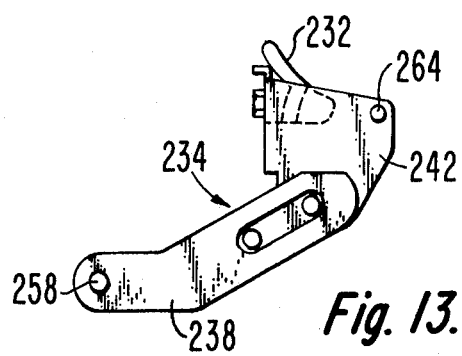
Figure 14:
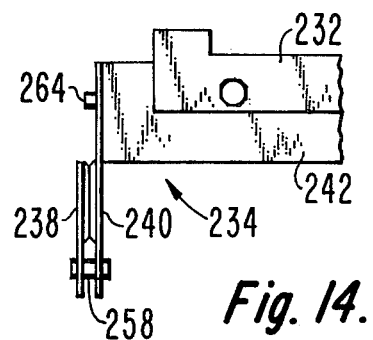
Figure 15:
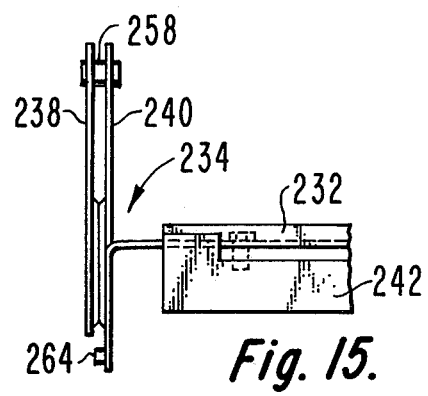
Figure 16:
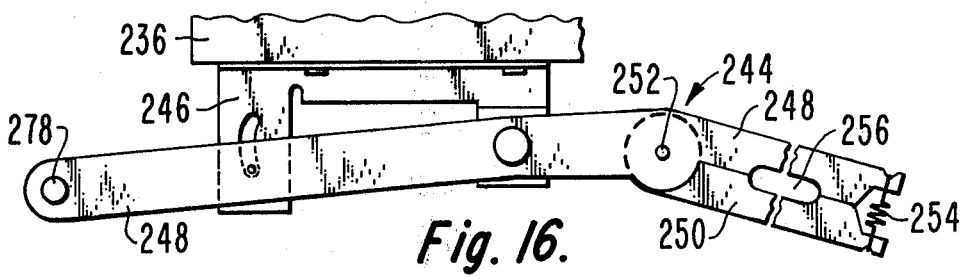
Figure 17:
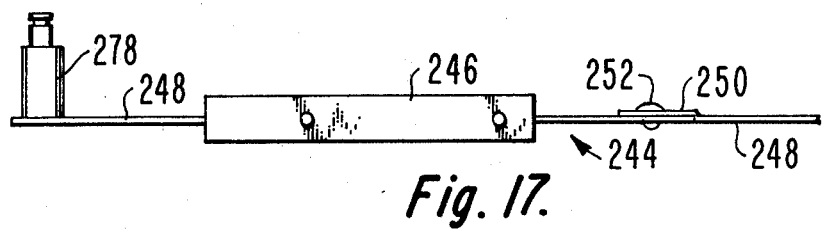
Figure 18:
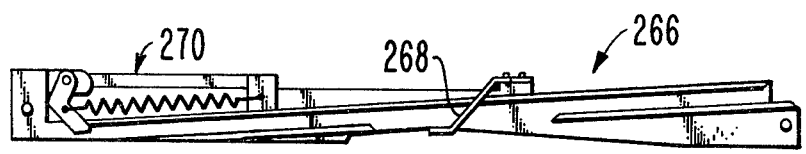
Figure 19:
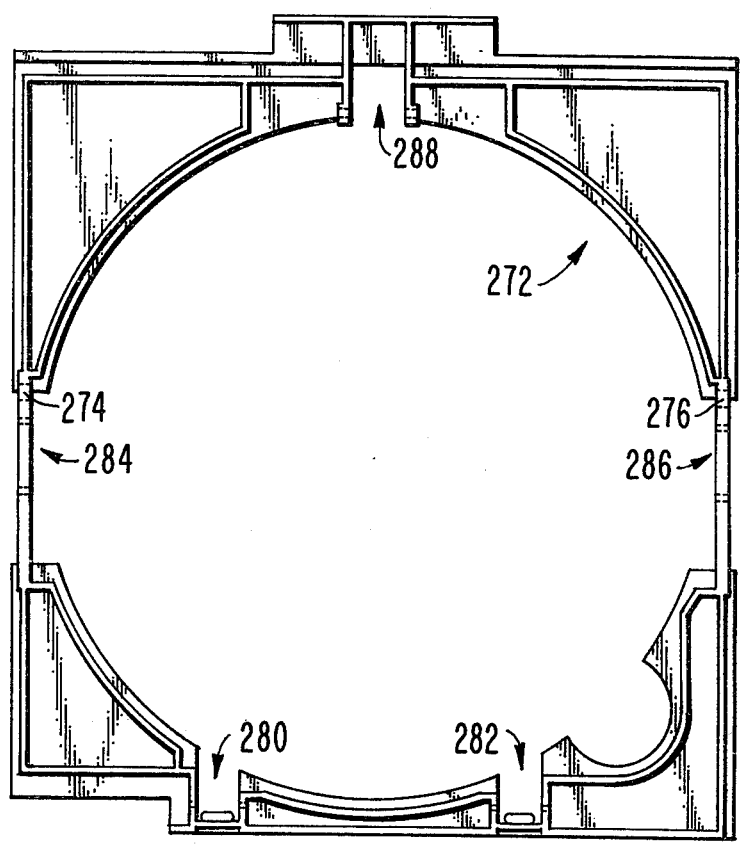
Figure 20:
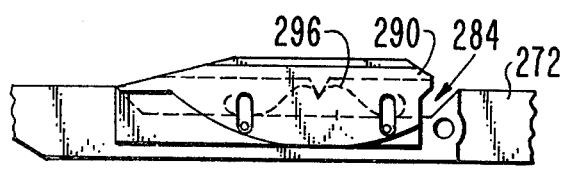
Figure 21:
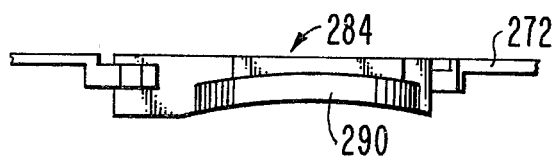
Figure 22:
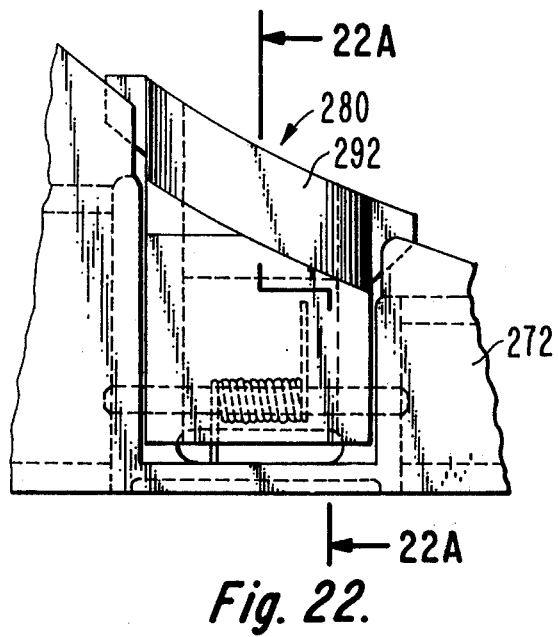
Figure 22A:
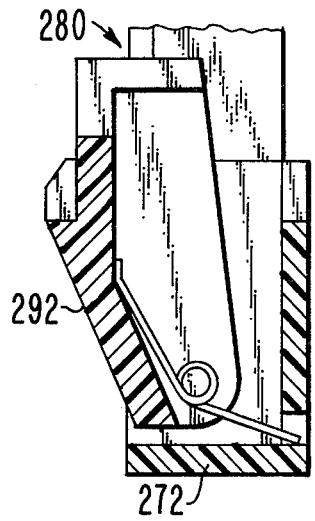
Figure 23:
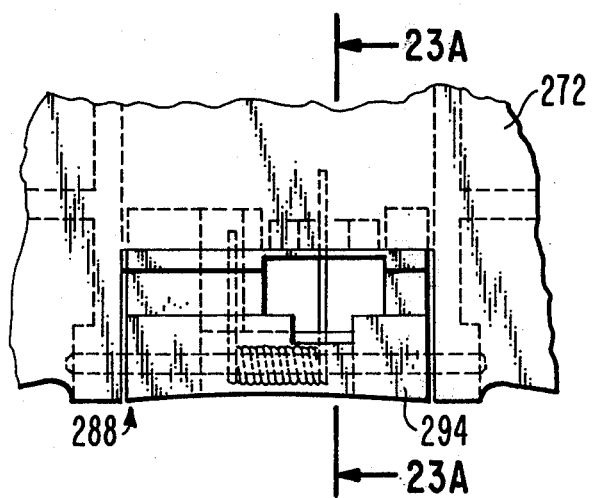
Figure 23A:
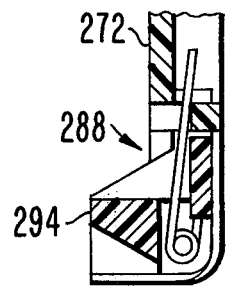
Figure 24:
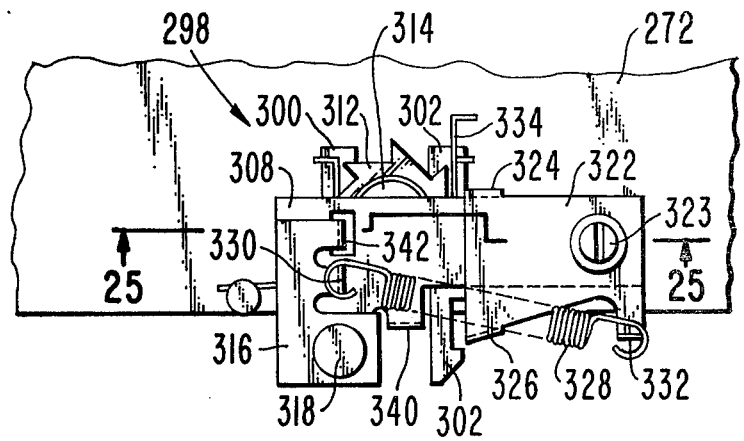
Figure 25:
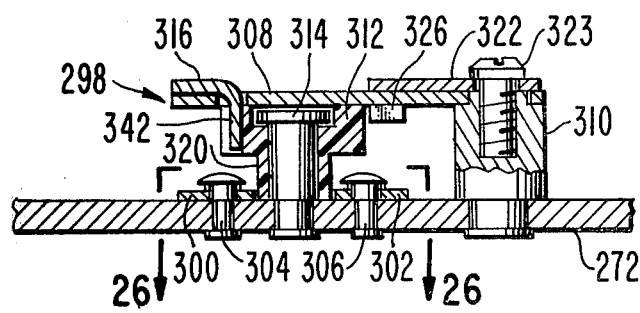
Figure 26:
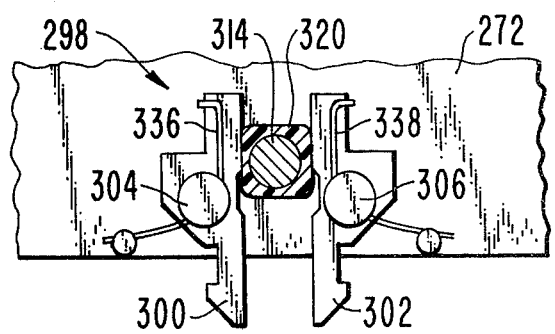

FIGS. 13, 14 and 15 respectively illustrate the end view, the front view and the plan view of a door bracket assembly suitable for use with the modified video disc system of FIG. 12;

FIGS. 16 and 17 show, respectively, the side view and the plan view of a platform linkage assembly subject to cooperation with the door bracket assembly of FIGS. 13-15 and suitable for use in the modified video disc system of FIG. 12;

FIG. 18 illustrates means for guiding a cover into the modified video disc system of FIG. 12; also shown in FIG. 18 is a cover ejecting mechanism;

FIG. 19 shows a bottom view of a movable platform suitable for use with the modified video disc system of FIG. 12;

FIGS. 20 and 21, respectively, illustrate the end view and the plan view of a left-center lifting pad assembly mounted on the platform of FIG. 19 and suitable for use in the modified video disc system of FIG. 12;

FIGS. 22 and 22a illustrate, respectively, the plan view and the end view of a left-front lifting pad mounted on the platform of FIG. 19 for use in the modified video disc system of FIG. 12;

FIGS. 23 and 23a show, respectively, the plan view and the end view of a rear lifting pad mounted on the platform of FIG. 19 for use in the modified video disc system of FIG. 12;

FIG. 24 illustrates a modified record extracting mechanism suitable for use in the video disc systems of FIGS. 7 and 12;

FIG. 25 is a sectional view of the modified record extracting mechanism along the line 25—25 in FIG. 24; and FIG. 26 is a sectional view of the modified record extracting mechanism along the line 26—26 in FIG. 25.

Figure 1:
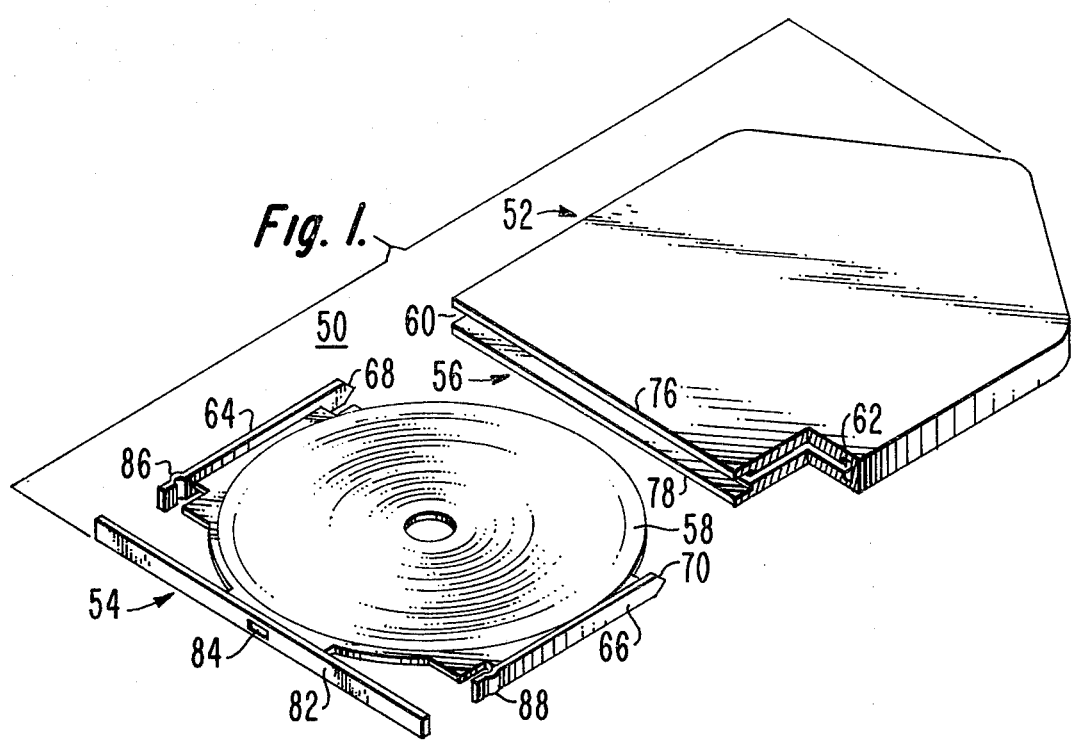
FIG. 1 is a perspective view of a protective cover comprising a jacket and a record retaining member removably located therein; the protective cover of FIG. 1 is suitable for use with a video disc system incorporating the present invention.
Figure 2:
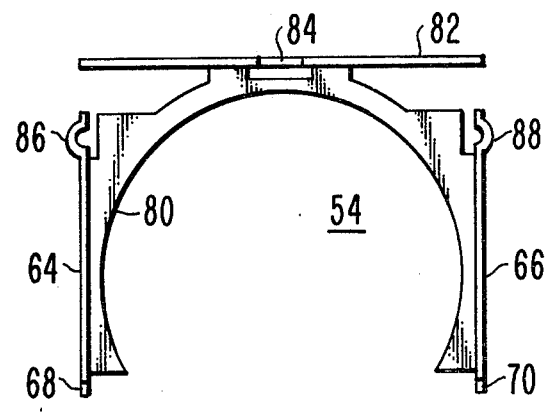
FIGS. 2 and 3 are the top views of the record retaining member and the jacket of FIG. 1.
Figure 3:
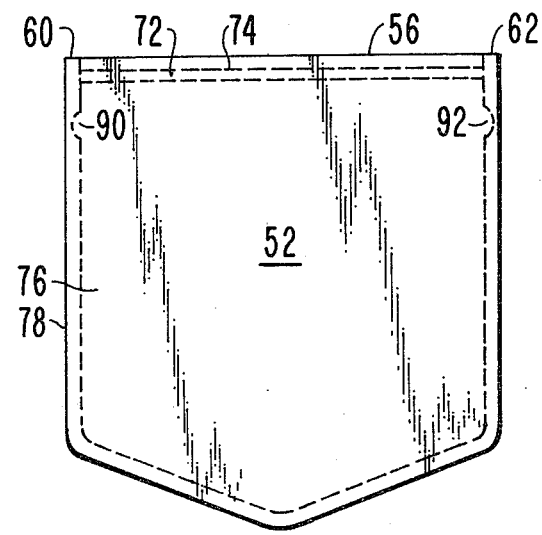

FIG. 1 is a perspective exploded view of a record protective cover 50 suitable for use with a video disc system described subsequently. As shown therein, the record cover comprises a sleeve-type jacket 52 and a record retaining tray 54. FIGS. 2 and 3 show, respectively, the top views of the tray and the jacket of FIG. 1. The jacket 52 has an end access opening 56 having dimensions permitting the tray 54, carrying a video disc 58, to slide freely therethrough. The protective cover is the subject of a copending U.S. application, Ser. No. 801,603, of L. A. Torrington, entitled, "*VIDEO DISC PACKAGE*" and filed concurrently herewith. The Torrington application is assigned of record to the assignee of the instant application.

The jacket 52 has a pair of channels 60 and 62 for receiving a pair of ribs 64 and 66 provided in the tray 54 in order to accurately locate the tray and the video disc 58 therein. The ribs 64 and 66 have wedge-shaped end portions 68 and 70 for leading the insertion of the tray 54 into the jacket 52.

As shown in FIG. 3, a pair of cleaning pads 72 and 74 made from suitable soft material (e.g., velvet) are secured to the interior surfaces of the panels 76 and 78 defining the jacket 52 to effect a wiping of a video disc during its insertion into and removal from the jacket. Other suitable materials for the wiping pads are (1) lintless, non-woven polyester paper made by DuPont and (2) polyurethane foam made by Scott Paper Co., Foam Division.

The thickness of the tray 54 is about the same as the thickness of the bead of the video disc 58. As shown in FIG. 2, the tray 54 has a generally circular through opening 80 having a diameter slightly greater than the diameter of the video disc 58. The tray 54 allows access to both faces of the video disc 58 without requiring any alteration of the position of the video disc within the tray or the jacket 52. Both the tray 54 and the video disc 58 are supported within the jacket 52 by the interior surfaces of the panels 76 and 78.

When the tray 54 is fully inserted into the jacket 52, the front portion 82 of the tray extends into the access opening 56 and closes it to keep dust or other contaminants from entering into the video disc enclosing cavity of the jacket.

The front portion 82 of the tray 54 has a record extracting member receiving hole 84 which is accessible in a direction substantially parallel to the direction of the to-and-fro movement of the tray in the jacket 52.

As shown in FIGS. 2 and 3, the tray 54 includes a pair of detents 86 and 88 which are received in the depressions 90 and 92 provided in the jacket 52 when the tray is fully inserted into the jacket. The detents prevent inadvertent slippage of an enclosed video disc from the jacket.

Figure 4:
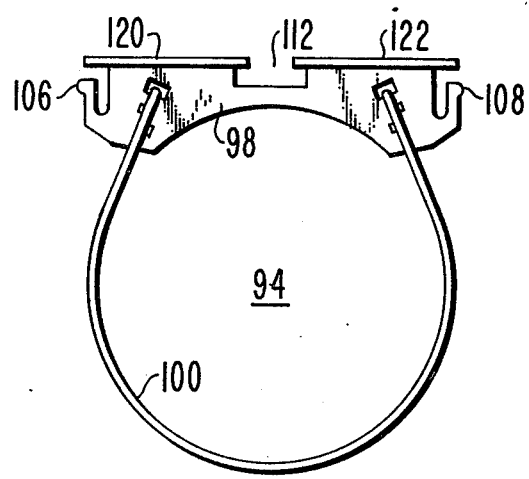
FIGS. 4 and 5 illustrate the top views of a modified record retaining member and a modified jacket.
Figure 5:
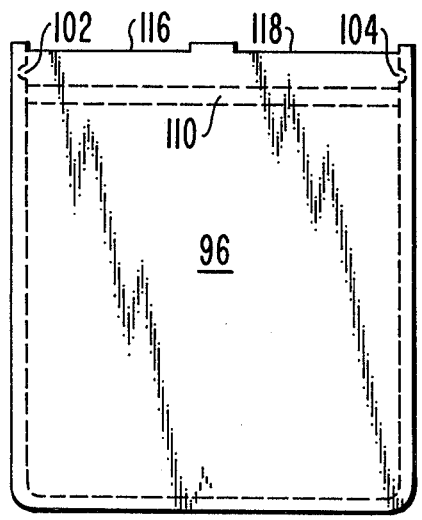

FIGS. 4 and 5 illustrate top views of a modified tray 94 and a modified jacket 96. As shown in FIG. 4, the modified tray 94 consists of a plastic spine portion 98 and an annular portion 100 defined by a wire form. The wire form is insert molded into the plastic spine portion.

Figure 4A:
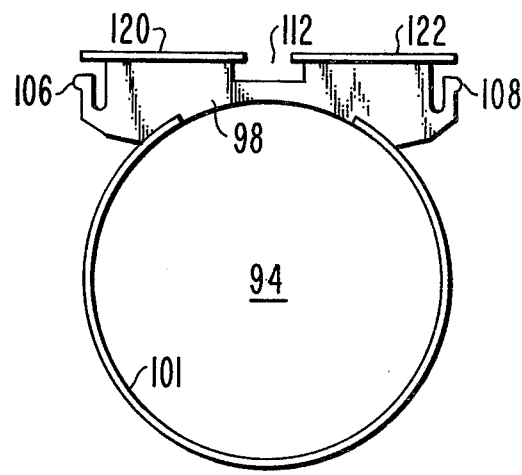
FIG. 4a shows another embodiment of the record retaining member suitable for use with the modified jacket of FIG. 5.

An alternate technique to the use of a wire form, is use of an extruded plastic tube. The ends of a plastic tube 101 may, for example, be glued to the spine portion 98 in order to define the annular portion as shown in FIG. 4a.

The jacket 96 has depressions 102 and 104 for receiving the detents 106 and 108 provided in the spine portion 98. A pair of soft wiping pads 110 are secured to the interior surfaces of the panels constituting the jacket 96 for cleaning the record during its insertion and removal. The spine portion 98 has a record extracting member receiving hole 112. The jacket 96 has recesses 116 and 118 for receiving the end portions 120 and 122 of the spine portion 94.

Figure 6:
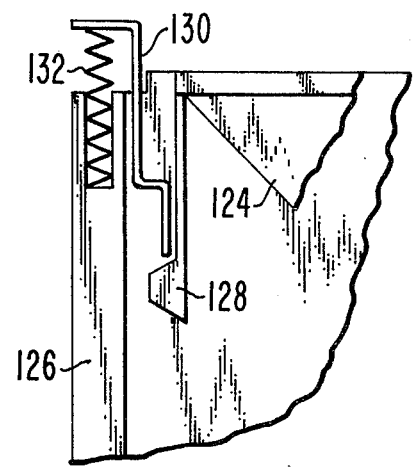
FIG. 6 shows a record retaining member release mechanism suitable for use in the protective cover of FIGS. 1-3 and FIGS. 4, 4a and 5.

Shown in FIG. 6 is an alternative technique for releasably securing a record retaining tray 124 to an enclosure 126. The top panel of the enclosure 126 is removed to expose the underlying details. The record retaining tray 124 has a detent member 128 which is disposed for cooperation with a member 130 slidably mounted within the enclosure for motion between an extended position, as shown in FIG. 6, and a depressed position (not shown). The slidable member 130, while in the extended position, precludes a removal of the tray 124 from the enclosure 126. The slidable member 130, while in the depressed position, causes the detent member 128 to retract permitting tray removal from the enclosure 126. A spring 132 is provided to bias the slidable member 130 to occupy the extended position. As explained subsequently, means are provided in the player to depress the slidable member 130 during cover arrival at a fully inserted position in the player to release the tray 124.

Figure 8:
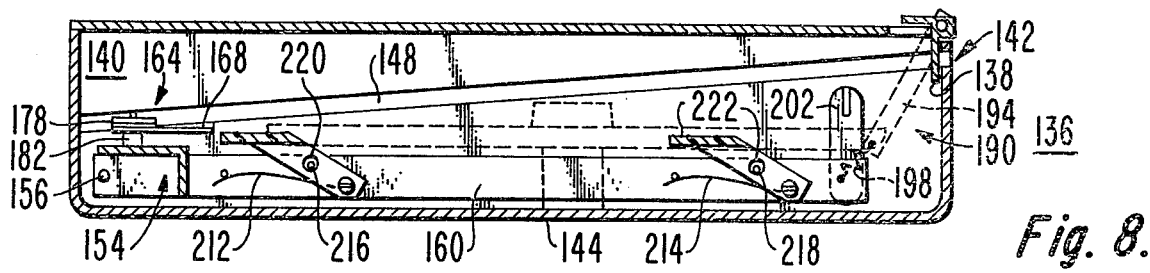
FIGS. 8 and 9 illustrate the side views of the video disc system of FIG. 7 including a movable platform shown, respectively, in a depressed position and an elevated position.
Figure 9:
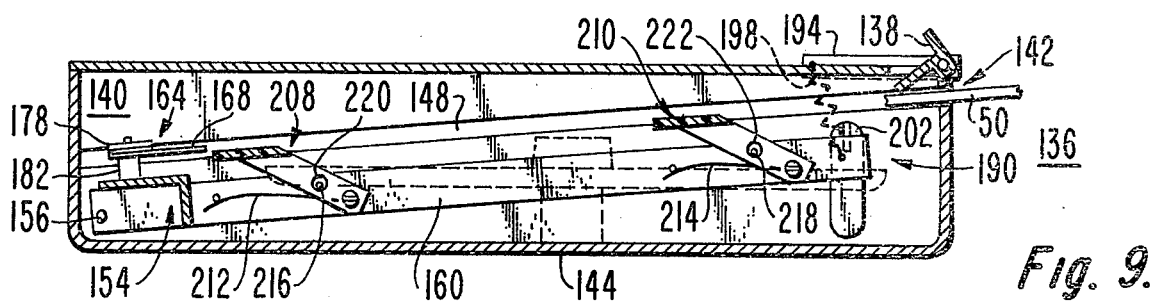

FIG. 7 is a plan view of a video disc player 136 of the variety described in the Clemens U.S. Pat. (No. 3,842,194). The player in FIG. 7 is shown with its lid removed. FIGS. 8 and 9 are sectional views of the video disc player of FIG. 7 along the center line thereof while a dust excluding flap 138 is disposed, respectively, in a closed position and an open position.

The player has a pollution free chamber 140 into which the record cover 50 is inserted through an input slot 142. The input slot 142 has dimensions which permit the record cover to slide therethrough without hindrance. The dust excluding flap 138 is pivotally mounted to the player housing 144 for motion between the closed position denying access to the chamber 140 (FIG. 8), and the open position permitting access to the chamber (FIG. 9). The flap 138 serves to keep the chamber 140 from being contaminated by dust or other foreign matter.

The player housing 144 is provided with a pair of channels 146 and 148 for guiding the insertion and removal of the record cover into and from the player. The channels 146 and 148 are disposed at an angle relative to the player housing 144 such that they are aligned with the input slot 142 at the front end of the player.

The video disc player further includes a turntable 150 for rotatably supporting a video disc during playback. The turntable 150 has a central spindle 152 subject to reception in the centering aperture of the video disc. A stylus arm carriage carrying a signal pickup device is not shown for the sake of clarity. The stylus arm carriage traverses the signal pickup across a turntable mounted video disc during playback.

A platform 154 is pivotally mounted about a rod 156 for motion between a depressed position (FIG. 8) and an elevated position (FIG. 9). The platform 154 comprises a pair of side rails 158 and 160 joined by a cross member 162 at the rear end of the player 136.

Figure 10:
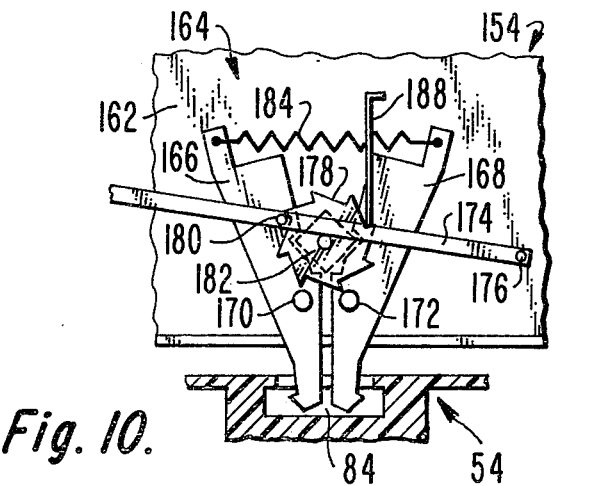
FIGS. 10 and 11 show a record extracting mechanism disposed, respectively, in a retracted condition and a deployed condition; the record extracting mechanism of FIGS. 10-11 is suitable for use with the video disc system of FIGS. 7 and 12.
Figure 11:
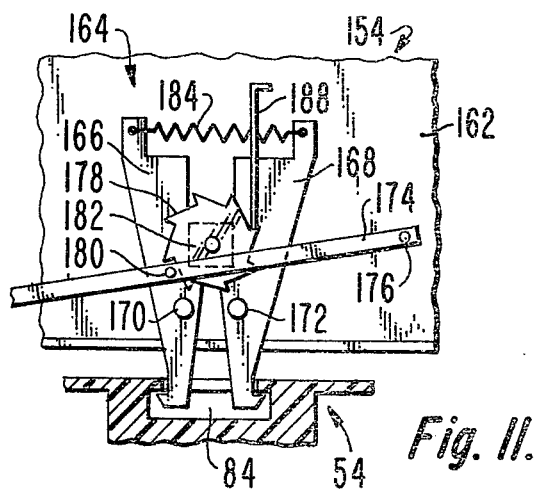

As shown in FIGS. 7, 10 and 11, a record extracting mechanism 164, having a pair of latch arms 166 and 168 which are pivoted around pins 170 and 172, is mounted at the rear end of the player 136 on the cross member 162. As can be seen from FIG. 9, the latch arms 166 and 168 are aligned with the center line of the channels 146 and 148 when the platform 154 is occupying the elevated position. The latch arms 166 and 168 are admitted into the hole 84 provided in the tray 54 when the record cover 50 is fully inserted into the player 136.

The record extracting mechanism 164 includes a paddle arm 174 pivoted about a pin 176 mounted on the cross member 162. The paddle arm 174 is rotated clockwise through an arc when the record cover is fully inserted into the player. The clockwise rotation of the paddle arm 174 causes a ratchet wheel 178, rotatably mounted on the cross member 162, to advance by one tooth, also in a clockwise direction, via a retractable pin 180 mounted on the paddle arm. Such rotation of the ratchet wheel 178 causes a square-shaped cam 182, disposed between the latch arms 166 and 168 and secured to the ratchet wheel, to advance by one step (e.g., 45°) in a clockwise direction. Such advancement of the square-shaped cam 182 causes the latch arms 166 and 168 to alternate between an extended condition (FIG. 10) and a retracted condition (FIG. 11). A spring 184 interconnects the rear ends of the latch arms 166 and 168 in order to assure continuous engagement between the latch arms and the cam 182.

When the record cover is withdrawn from the player 136, a spring 186 causes the paddle arm 174 to return to its home position shown in FIGS. 7 and 10. The record extracting mechanism 164 includes a pawl 188 for preventing a reversal of the motion of the ratchet wheel 178 as the paddle arm 174 returns to its home position. It can be seen from FIGS. 7, 10 and 11 that although the pawl 188 prevents a motion of the ratchet wheel 178 in the reverse (anticlockwise) direction, it allows the forward motion (clockwise) of the ratchet wheel. The pin 180 is made retractable in order to allow the paddle arm 174 to return to its home position without requiring the ratchet wheel 178 to rotate in the reverse direction.

Thus, each time the record cover is fully inserted into the player 136, the condition of the latch arms 166 and 168 is alternated between the extended condition (FIG. 11) and the retracted condition (FIG. 10). The alternating apparatus is the subject of a copending U.S. application, Ser. No. 801,602, of C. A. Elliott, et al. entitled, "*PACKAGE ACTUATED RECORD EXTRACTING MECHANISM FOR A VIDEO DISC PLAYER*," and filed concurrently herewith. The Elliott, et al. application is assigned of record to the assignee of the instant application. The function of the record extracting mechanism 164 will be explained in detail subsequently.

The player 136 further includes platform linkage assembly 190 for causing the motion of the platform 154 between the depressed position (FIG. 8) and the elevated position (FIG. 9) in response to motion of the flapper door 138, respectively, between the access denying position (FIG. 8) and the access permitting position (FIG. 9). The platform linkage assembly 190 includes a pair of levers 192 and 194 secured to the door 138 for rotation therewith. The platform linkage assembly 190 further includes a pair of springs 196 and 198 interconnecting the free ends of the levers 192 and 194 and the side rails 158 and 160. A pair of stop pins 200 and 202 are mounted to the player housing 144 for ensuring that the platform 154 is raised to a correct height when the flapper door 138 is opened, as a result of the insertion of the record cover into the player 136, in the manner shown in FIG. 9. The springs 196 and 198 allow the flapper door 138 to over-travel when the record cover is fully inserted into the player so that the platform 154 rises to the correct height without the need for precision parts.

A set of spring loaded lifting pads 204-210 are pivotally mounted to the rails 158 and 160 for a purpose which will be described subsequently. A set of wire springs (e.g., 212 and 214) are provided to bias the lifting pads (e.g., 208 and 210) toward a raised position as shown in FIGS. 8 and 9. A set of pins (e.g., 216 and 218) are secured to the rails (e.g., 160) for reception in apertures (e.g., 220 and 222) provided in the lifting pads (e.g., 208 and 210) so as to accurately locate the top surfaces of the lifting pads relative to the platform 154 (FIGS. 8 and 9). A member 224 (FIG. 7) interconnects the rear lifting pads 206 and 208.

The operation of the system will now be described in conjunction with FIGS. 7-11. When the record cover, carrying a video disc, is inserted into the player 136 through the input slot 142, it lifts the flapper door 138, whereby the platform 154 is caused to rise as shown in FIG. 9. The insertion of the record cover into the player 136 causes the lifting pads 204-210 to retract with the confines of the platform 154, allowing the record cover to arrive at a fully inserted position in the player. As the record cover arrives at the fully inserted position in the player 136, the latch arms 166 and 168 are admitted into the hole 84 of the tray 54 (FIG. 10).

The arrival of the record cover at the fully inserted position in the player 136 causes the latch arms 166 and 168 to change from the retracted condition (FIG. 10) to the extended condition (FIG. 11), thereby locking the tray 54 to the platform 154. As the enclosure 52 is withdrawn thereafter (1) the latch arms 166 and 168 retain the tray 54, carrying the video disc 58, in the player and (2) the wire springs (e.g., 212 and 214) cause the lifting pads 204-210 to return to the desired raised position. Thus, the tray 54 and the video disc 58 are retained in the player 136 resting on the lifting pads 204-210 at an appropriate level (i.e., having their center lines aligned with the center lines of the channels 146 and 148) upon a conclusion of enclosure withdrawal.

Additionally, enclosure withdrawal from the player 136 allows the flapper door 138 to move to the access denying position shown in FIG. 8. Such motion of the flapper door 138 causes the platform 154 to move to the depressed position, as shown in FIG. 8, effecting a transfer of the video disc 58 from the lifting pads 204–210 to the turntable 150 for playback.

When an empty jacket is inserted into the player 136 through the input slot 142 (FIG. 9), the flapper door 138 is opened causing the platform 154 to rise to the elevated position (FIG. 9). As the platform 154 rises, the lifting pads 204–210 lift the tray 54 and the video disc 58 therewith.

When the platform 154 reaches the elevated position (FIG. 9), the lifting pads 204–210 support the tray 54 and the video disc 58 so that their center lines are aligned with the center line of the empty jacket 52, causing the tray and the video disc to return to the jacket during its insertion. The alignment apparatus is the subject of a copending U.S. application, Ser. No. 801,728, of R. DeStephanis entitled, "*RECORD SUPPORT AND ALIGNMENT APPARATUS FOR A VIDEO DISC PLAYER,*" and filed concurrently herewith. The DeStephanis application is assigned of record to the assignee of the instant application. When the jacket 52 is fully inserted into the player 136, it causes the latch arms 166 and 168 to change from the extended condition (FIG. 11) to the retracted condition (FIG. 10) releasing the tray 54. When the jacket 52 is removed from the player 136, detents 86 and 88 (FIG. 2) cause the enclosed tray 54 and the video disc 58 to leave the player.

Thus, it will be seen that the above-described system allows a video disc to be inserted into and removed from the player without its direct handling by the consumer.

A second embodiment of the video disc player incorporating the principles of the present invention will now be explained in conjunction with FIGS. 12–26. FIG. 12 illustrates the side view of a modified video disc player 230. As shown therein, a flapper door 232 is secured to a bracket assembly 234 pivotally mounted to the player housing 236 by means of a pin 264.

FIGS. 13, 14 and 15 illustrate the end view, the front view and the top view of the pivoted bracket assembly 234 which is mounted on the left hand side of the player 230. A similar bracket assembly is pivotally mounted on the right hand side of the player 230. The bracket assembly 234 includes a pair of plate members 238 and 240 secured to a door bracket member 242.

As shown in FIG. 12, a platform linkage assembly 244 is pivotally mounted to the player housing 236 by means of a support bracket 246.

FIGS. 16 and 17 illustrate the end view and the top view of the platform linkage assembly 244 which is mounted on the left hand side of the player 230. A similar linkage assembly is provided on the right hand side of the player 230. The platform linkage assembly 244 includes levers 248 and 250 which are rotatably secured to each other by a rivet 252. The ends of the levers 248 and 250 are interconnected by a spring 254. The levers 248 and 250 define an elongated slot 256 in which a pin 258, secured to the plate members 238 and 240 as shown in FIGS. 13–15, is slidably received.

When a record cover 260 is inserted into the modified player 230 through an input slot 262, the door bracket 242 is pivoted about the pin 264 causing the distal end of the lever 248 to rise. The player 230 includes a pair of rails aligned with the input slot 262 for facilitating cover insertion and removal. FIG. 18 shows a guiding rail 266 which is mounted on the right hand side of the player 230. A similar guiding rail is mounted on the left hand side of the player 230. A record hold down spring 268 is secured to the rail 266. Also shown in FIG. 18 is a cover ejecting mechanism 270. The cover ejecting mechanism 270 ejects the cover after the enclosed tray is released by the record extracting mechanism and ejects the jacket after the enclosed tray is gripped by the record extracting mechanism.

A platform 272, the bottom view of which is shown in FIG. 19, is mounted in the modified player 230, for motion between an elevated position and a depressed position. The platform 272 has holes 274 and 276 for receiving pins (e.g., a pin 278 in FIG. 17) secured to the linkage assembly levers (for example, the lever 248 in FIG. 17).

From FIG. 12, it will be seen that the insertion of the record cover 260 into the input slot 262 of the player 230 causes the flapper door 232 to open which, in turn, causes the platform 272 to rise to the elevated position. In a similar manner, the withdrawal of the record cover 260 from the player 230 causes the platform to move to the depressed position, which, in turn, causes the flapper door 232 to close.

The configuration of the platform lifting/lowering mechanism of FIG. 12 is such that the motion of the platform from the depressed position to the elevated position takes place in two stages. In the first stage, the platform is pivoted about its distal end, and in the second stage, the platform is pivoted about its adjacent end, as the linkage assembly pins (e.g., the pin 278) are raised in response to cover insertion. In a similar fashion, the lowering of the platform also occurs in two stages.

An advantage of the platform lifting/lowering mechanism of FIG. 12, which causes a teeter-totter movement of the platform, is that for a given turntable diameter and for a given height through which the platform must be raised, the fore-and-aft dimension of the platform is relatively reduced, for example, in comparison with the platform lifting/lowering arrangement of FIGS. 7–9.

A set of five lifting pads — front-left pad, front-right pad, left-center pad, right-center pad and rear pad — are retractably mounted on the platform, respectively, at positions 280, 282, 284, 286 and 288. FIGS. 20 and 21, respectively, show the side view and the plan view of a left-center pad 290. Illustrated in FIGS. 22 and 22a is a front-left pad 292 and a rear pad 294 is shown in FIGS. 23 and 23a.

The lifting pads, while in retracted conditions, allow cover arrival at a fully inserted position in the player. The lifting pads, while in deployed conditions, support a retained record such that, when the platform is occupying the raised position, the record is aligned with an empty cover being inserted into the player through the input slot to facilitate the return of the retained record into the cover.

The lifting pads are caused to move to the retracted condition during cover arrival at the fully inserted position in the player. Biasing means (e.g., a wire spring 296 in FIG. 20) are provided to urge the lifting pads to return to the deployed condition.

A modified record extracting mechanism 298 will now be explained in light of the FIGS. 24–26. FIG. 24 is a plan view of the modified record extracting mechanism 298. Shown in FIG. 25 is a sectional view of the record extracting mechanism 298 along the line 25—25 in FIG. 24. FIG. 26 illustrates a sectional view of the record extracting mechanism 298 along the line 26—26 in FIG. 25. The modified record extracting mechanism 298 is mounted on the platform 272 of the video disc player 230 shown in FIG. 12. While the use of the modified record extracting mechanism is explained in the context of the video disc player 230 of FIG. 12, it must be noted that it is also suitable for use in the video disc player 136 of FIGS. 7-9.

As shown in FIG. 26, the modified record extracting mechanism 298 includes a pair of latch arms 300 and 302 pivoted around the pins 304 and 306. The latch arms 300 and 302 are aligned with the center line of the guide rails (e.g., the guide rail 18) when the platform 272 is disposed in the elevated position.

A paddle arm 308 is pivotally mounted to the platform 272 by a pin 310 (FIG. 25). The clockwise rotation of the paddle arm 308 causes an indexing wheel 312, rotatably mounted on the platform 272 by a pin 314, to advance by one tooth, also in a clockwise direction, via a tang 342 of an actuating arm 316 pivotally secured to the paddle arm by a pin 318. Such a rotation of the indexing wheel 312 causes a square-shaped cam 320, disposed between the latch arms 300 and 302 and secured to the indexing wheel, to advance by one step (e.g., 45°) in a clockwise direction. Such advancement of the square-shaped cam 320 causes the latch arms to alternate between an extended condition and a retracted condition.

A plate member 322 is fixedly secured to the platform 272 by a bolt 323. The plate member 322 has extensions 324 and 326 for restricting the arcuate motion of the paddle arm 308. A spring 328 is interconnected between a projection 330 of the actuating arm 316 and a projection 332 of the fixedly mounted plate member 322 to bias the actuating arm and the paddle arm 308 to return to their home positions. The record extracting mechanism 298 includes a pawl 334 (FIG. 24) for preventing a reversal of the motion of the indexing wheel 312 during return motion of the paddle arm 308. Wire springs 336 and 338 (FIG. 26) are provided to bias the latch arms 300 and 302 in continuous engagement with the cam 320.

The paddle arm 308 has an extension 340 (FIG. 24) which engages the front portion of a record cover during its arrival at a fully inserted position in the player to cause a clockwise movement of the paddle arm.

The operation of the modified video disc player described with the help of FIGS. 12-26 is similar to the operation of the video disc player of FIGS. 7-9.

What is claimed is:

1. A player apparatus for recovering prerecorded signals from a disc record comprising:
   (A) a protective cover including a jacket having a record enclosing cavity and a record retaining member removably located within said jacket;
   (B) a housing having an input slot dimensioned to permit an insertion of said cover into said player and its removal therefrom;
   (C) means aligned with said input slot for guiding said cover insertion and removal;
   (D) a turntable rotatably mounted in said housing for supporting a record during playback;
   (E) means mounted in said player for engaging said record retaining member during cover arrival at a fully inserted position in said player;
   said engaging means being subject to operation in a first condition and a second condition;
   said engaging means, while disposed in said first condition, permitting cover arrival at said fully inserted position;
   (F) means responsive to cover arrival at said fully inserted position in said player for alternating the condition of said engaging means between said first condition and said second condition;
   said engaging means, while disposed in said second condition, causing a removal of said record retaining member from said jacket during a jacket withdrawal subsequent to an occupied cover arrival at said fully inserted position in a manner that such a jacket withdrawal results in retention of an enclosed record in said player;
   (G) a platform mounted in said housing subject to motion between an elevated position and a depressed position;
   said platform being disposed under said guide means for supporting a retained record when said platform is disposed in said elevated position; and
   (H) means for causing motion of said platform to said depressed position to effect a transfer of said retained record to said turntable for rotation therewith with independence from said record retaining member.

2. A player as defined in claim 1 wherein said turntable is disposed lower than said platform when said platform is occupying said elevated position; and wherein said platform has an opening having dimensions greater than the diameter of said turntable for permitting said turntable to protrude beyond said platform when said platform is occupying said depressed position to effect said transfer.

3. A player as defined in claim 1 wherein said platform motion causing means includes means for biasing said platform toward said depressed position.

4. A player as defined in claim 1 wherein the position of said platform relative to said guide means is such that, when an empty jacket is inserted in said input slot while a retained record is resting on said platform occupying said elevated position, said retained record is admitted into said empty jacket along with said record retaining member.

5. A player for recovering prerecorded signals from a disc record removably subject to occupancy of a protective cover comprising a jacket and a record retaining member removably located therein; said player comprising:
   (A) a housing having an input slot dimensioned to permit an insertion of a cover into said player and its removal therefrom;
   (B) means aligned with said input slot for guiding said cover insertion and removal;
   (C) a turntable rotatably mounted in said housing for supporting a record during playback;
   (D) means mounted in said player for engaging the record retaining member during cover arrival at a fully inserted position in said player;
   said engaging means being subject to operation in a first condition and a second condition;
   said engaging means, while disposed in said first condition, permitting cover arrival at said fully inserted position;
   (E) means responsive to cover arrival at said fully inserted position in said player for alternating the condition of said engaging means between said first condition and said second condition;

said engaging means, while disposed in said second condition, causing a removal of a record retaining member from said jacket during a jacket withdrawal subsequent to an occupied cover arrival at said fully inserted position in a manner that such a jacket withdrawal results in retention of an enclosed record in said player;

(F) a platform mounted in said housing subject to motion between an elevated position and a depressed position;

said platform being disposed under said guide means for supporting a retained record when said platform is disposed in said elevated position;

(G) closure means secured to said housing for motion between a first position denying an access to said input slot and a second position permitting an access to said input slot; and (H) means responsive to motion of said closure means between said access denying position and said access permitting position for causing motion of said platform, respectively, between said depressed position and said elevated position;

wherein motion of said platform to said depressed position effects a transfer of said retained record to said turntable for rotation therewith with independence from said record retaining member.

6. A player as defined in claim 5 wherein said securing of said closure means to said housing is such that a cover insertion into said input slot causes said closure means to move from said access denying position to said access permitting position.

7. A player as defined in claim 6 including means for biasing said closure means toward said access denying position; wherein a cover withdrawal from said fully inserted position in said player causes said closure means to move from said access permitting position to said access denying position.

8. A system as defined in claim 5 wherein said platform is pivoted about an axis, disposed substantially parallel to said input slot, for rotation between said elevated position and said depressed position; said system further including means for linking said platform to said closure means so that said platform, respectively, occupies said elevated position and said depressed position when said closure means is occupying said access permitting position and said access denying position.

9. A system as defined in claim 8 wherein said platform rotation axis is located toward the distal end of said platform relative to said input slot; wherein said linking means is so constructed that its connection to said platform is spaced from said platform rotation axis.

10. A system as defined in claim 5 wherein said platform is rotatably mounted on an axle; said axle being disposed substantially parallel to said input slot and located intermediate between the ends of said platform remote from and adjacent to said input slot; and said system further including means for connecting said axle to said closure means so that said platform is translated from said depressed position to said elevated position in response to motion of said closure means from said access denying position to said access permitting position.

11. A system as defined in claim 10 wherein the axle is located such that said translation of said platform from said depressed position to said elevated position occurs in two phases--in the first phase, said platform is pivoted about said remote end thereof and in the second phase, said platform is pivoted about said adjacent end thereof as said axle is raised by said connecting means in response to motion of said closure means from said access denying position to said access permitting position.

12. An apparatus for recovering prerecorded signals from a disc record comprising:

(A) a protective cover including a jacket having a record enclosing cavity and a record retaining member removably located within said jacket;

(B) a housing having an input slot dimensioned to permit an insertion of said cover into said player and its removal therefrom;

(C) a turntable rotatably mounted in said housing for supporting a record during playback;

(D) means mounted in said player for engaging said record retaining member during cover arrival at a fully inserted position in said player;

said engaging means being subject to operation in a first condition and a second condition;

said engaging means, while disposed in said first condition, permitting cover arrival at said fully inserted position;

(E) means responsive to cover arrival at said fully inserted position in said player for alternating the condition of said engaging means between said first condition and said second condition;

said engaging means, while disposed in said second condition, causing removal of said record retaining member from said jacket during a jacket withdrawal subsequent to an occupied cover arrival at said fully inserted position in a manner that such a jacket withdrawal results in retention of an enclosed record in said player;

(F) a platform mounted in said housing subject to motion between an elevated position and a depressed position; said platform supporting a retained record when said platform is disposed in said elevated position; and (G) means for causing motion of said platform to said depressed position to effect a transfer of said retained record to said turntable for rotation therewith with independence from said record retaining member.

* * * * *